United States Patent [19]
Yanagi

[11] Patent Number: 6,118,528
[45] Date of Patent: Sep. 12, 2000

[54] MEASURING CONTAINER FOR CONTACT LENS METER

[75] Inventor: Eiichi Yanagi, Tokyo, Japan

[73] Assignee: Kabushiki Kaisha Topcon, Tokyo, Japan

[21] Appl. No.: 09/173,750

[22] Filed: Oct. 16, 1998

Related U.S. Application Data

[62] Division of application No. 08/845,025, Apr. 21, 1997, Pat. No. 5,847,819.

[30] Foreign Application Priority Data

Apr. 19, 1996 [JP] Japan ................................. 8-98117

[51] Int. Cl.[7] ........................................................ G01N 1/10
[52] U.S. Cl. ........................... 356/246; 356/244; 356/124
[58] Field of Search ..................................... 356/244, 246, 356/124–128

[56] References Cited

U.S. PATENT DOCUMENTS

| | | | |
|---|---|---|---|
| 3,779,648 | 12/1973 | Poster | 356/124 |
| 4,072,428 | 2/1978 | Moss | 356/244 |
| 4,277,172 | 7/1981 | Richards | 356/244 |
| 4,415,076 | 11/1983 | Campbell | 206/5.1 |
| 4,496,243 | 1/1985 | Machida | 356/244 |

*Primary Examiner*—Frank G. Font
*Assistant Examiner*—Phil Natividad
*Attorney, Agent, or Firm*—Finnegan, Henderson, Farabow, Garrett & Dunner, L.L.P.

[57] ABSTRACT

A lens meter is provided which includes a light source portion which emits measuring light having at least three different wavelengths; a light receiving portion which receives the measuring light which has passed through a to-be-inspected lens immersed in a liquid as a medium; an in-medium optical characteristic measuring device for measuring an optical characteristic of the lens in the medium about each wavelength, based on a deviated quantity of the measuring light detected by the light receiving portion; a refractive index calculating device for calculating a refractive index of material of the lens, based on a difference of the optical characteristic of the lens in the medium among the wavelengths; and a converting device for converting the optical characteristic of the lens in the medium into an optical characteristic of the lens in the air, based on the refractive index calculated by the refractive index calculating device.

3 Claims, 5 Drawing Sheets

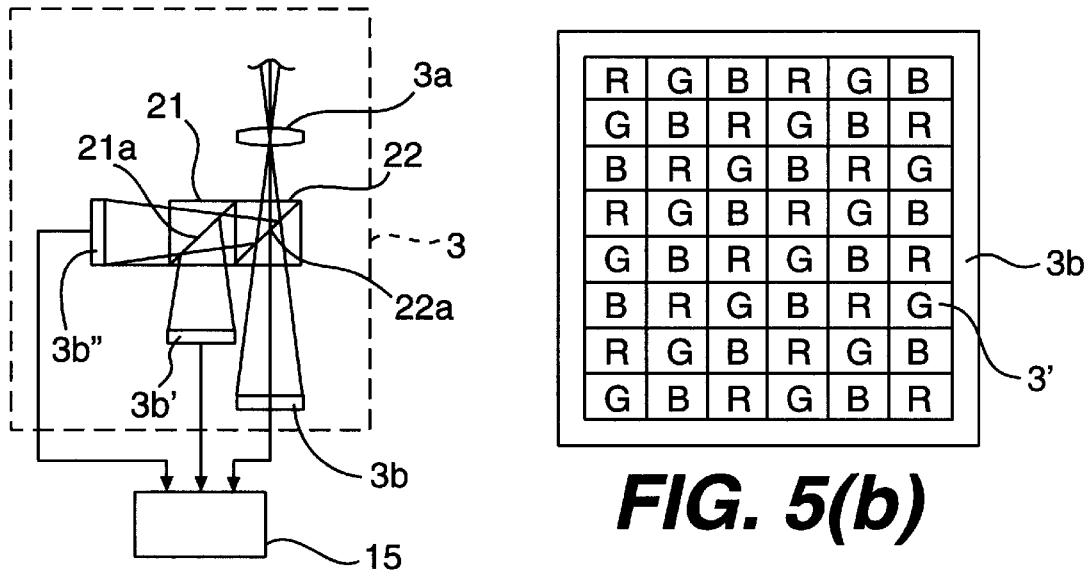
FIG. 5(a)
FIG. 5(b)
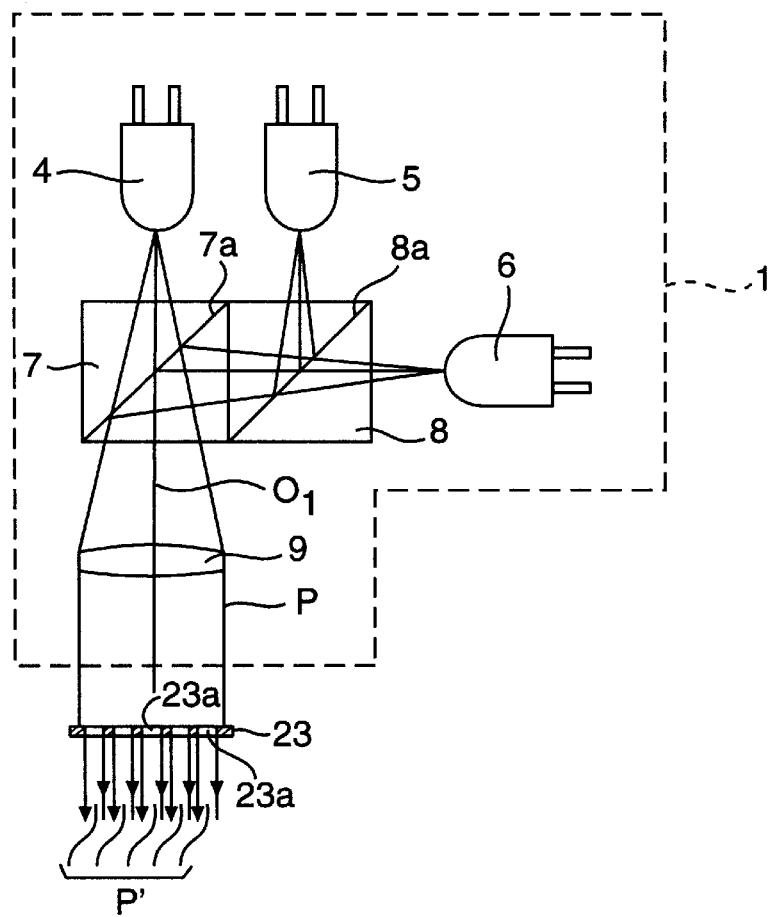
FIG. 6

MEASURING CONTAINER FOR CONTACT LENS METER

This is a division of application Ser. No. 08/845,025, filed Apr. 21, 1997 U.S. Pat. No. 5,847,819, all of which are incorporated herein by reference.

BACKGROUND OF THE INVENTION

1. Field of the Invention

This invention relates to a lens meter capable of measuring the characteristics of a lens to be inspected while immersing the lens in a liquid, and relates to a measuring vessel for use in the lens meter.

2. Description of Related Art

A lens meter is known in which a lens to be inspected is laid on a lens receiving plate, a beam of measuring light emitted by a light source is then projected onto the lens, and the measuring light which has passed through the lens is received by a photoelectric sensor. The lens meter calculates a difference between a light receiving position on the photoelectric sensor where the measuring light is received when the lens is laid on the lens receiving plate and a light receiving position on the photoelectric sensor where the measuring light is received when the lens is not laid thereon. According to the difference, the optical characteristic of the lens, namely, the power distribution of the lens is measured in the air. This type of lens meter is used to measure the optical characteristic of a lens, such as a spectacle lens or a hard contact lens (HCL), which is rigid in material.

Some of lenses to be inspected are soft in material. If a soft contact lens (SCL), for example, is laid on the lens receiving plate to measure the optical characteristic thereof in the air, the shape of the soft contact lens is deformed during measurement because of gravity. Additionally, the soft contact lens has another feature in that its material itself holds plenty of water. For this reason, if much time is consumed for measurement, the soft contact lens is dried up with the lapse of time and thereby undergoes a change in refractive index of its material itself. This makes it difficult to accurately measure the optical characteristic of the soft contact lens by the use of the conventional lens meter in which the optical characteristic of a lens to be inspected is measured in the air. In addition, the adhesion of water droplets to the surface of the lens causes the scattering of measuring light and makes it difficult to accurately measure the optical characteristic thereof.

In order to solve these problems, there has been attempted the experiment of immersing a lens to be inspected in a liquid and measuring the optical characteristic of the lens. Referring especially to a soft contact lens, a lens meter has been developed in which the soft contact lens is immersed in a liquid (e.g., physiological salt solution) contained in a transparent vessel (e.g., transparent cell) so as to prevent the soft contact lens from being naturally dried up and being deformed by its own weight and thereafter the optical characteristic of the soft contact lens is measured. This type of lens meter is capable of measuring the optical characteristic of the soft contact lens with accuracy because the soft contact lens is prevented from being naturally dried up and being deformed by its own weight.

However, since the refractive index of a liquid is larger than that of air, the optical characteristic of the soft contact lens which has been measured in the liquid apparently becomes smaller than that measured in the air. Generally, measurement values obtained by measurement in the air are used for the optical characteristic of a lens, such as a spectacle lens or a contact lens, to be inspected. For this reason, when a contact lens is measured, a difference occurs between a measurement value obtained in the liquid and a measurement value obtained in the air. Conventionally, this difference has been corrected in such a way that the refractive index of the material of a soft contact lens and the refractive index of a liquid in which the soft contact lens is immersed are input to an arithmetic means of a lens meter, so that a measurement value obtained by measurement of the soft contact lens in the liquid is converted into a measurement value obtained by measurement thereof in the air.

In detail, on the supposition that the thickness of the contact lens is very thin, the refractive index $S_0$ of the contact lens in the air is obtained by the following equation:

$$S_0 = 1/f_0 = (n-1)(1/r_1 - 1/r_2) \qquad (1)$$

wherein $f_0$ is a focal length of the contact lens in the air, n is a refractive index of material of the contact lens, and $r_1$ and $r_2$ are radii of curvature of the respective surfaces of the contact lens.

On the other hand, the refractive index $S_w$ of the contact lens immersed in a liquid is obtained by the following equation:

$$S_w = 1/f_w = \{(n-n_w)/n_w\}(1/r_1 - 1/r_2) \qquad (2)$$

wherein $f_w$ is a focal length of the contact lens in the liquid, and $n_w$ is a refractive index of the liquid.

In this example, let it be supposed that a beam of measuring light passes through a transparent cell and reaches a light receiving portion of the lens meter through the air. Additionally, let it be supposed that both a liquid layer existing on the side of the rear surface of the transparent cell and a cell wall of the transparent cell are thin enough to be negligible.

If so, Eq. (2) can be approximated to the following equation:

$$S_v 1/f_v = 1/(n_w \cdot f_w) \qquad (3)$$

wherein $S_v$ is an apparent refractive index, and $f_v$ is an apparent focal length.

That is, the apparent refractive index $S_v$ differs from the refractive index $S_0$ in the air.

The refractive index $S_0$ in the air is obtained from the apparent refractive index $S_v$ in the liquid on the basis of the following equation:

$$S_0 = (n-1)\{S_v \cdot n_w/(n-n_w)\} \qquad (4)$$

This means that the apparent refractive index $S_v$ in the liquid is convertible to the refractive index $S_0$ in the air if both the refractive index $n_w$ of the liquid and the refractive index n of the material of the contact lens are known.

In some cases, there is a need to measure optical characteristics of soft contact lenses fitted over the eyes of a subject in an ophthalmic hospital or a contact lens clinic. In these cases, it is often impossible to trace a manufacturer (maker) of the soft contact lenses fitted over the subject's eyes or ascertain a trade mark including, for example, an article number thereof. Therefore, the refractive index of material of the soft contact lens is often unknown. Even if data concerning the manufacturer has been obtained, the refractive index of the material of the soft contact lens varies because of adhesion of protein to the soft contact lens which is caused by wearing the soft contact lens continuously. This variation is unpredictable. Therefore, it is impossible to convert a measurement value of the soft contact lens measured in a state of being immersed in a liquid into a measurement value of the identical soft contact lens measured in the air with accuracy.

SUMMARY OF THE INVENTION

It is therefore an object of the present invention to provide a lens meter which is capable of accurately converting a measurement value of the optical characteristic of a lens to be inspected which has been measured in a liquid into a measurement value of the optical characteristic of the identical lens measured in the air even if the refractive index of material of the lens is unknown and to provide a measuring vessel for use in the lens meter.

In order to achieve the object, a lens meter according to an aspect of the present invention comprises a light source portion for emitting measuring light having at least three different wavelengths; a light receiving portion for receiving the measuring light which has passed through a lens to be inspected, the lens being immersed in a liquid as a medium; an in-medium optical characteristic measuring means for measuring an optical characteristic of the lens in the medium about each wavelength, based on a deviated quantity of the measuring light detected by the light receiving portion; a refractive index calculating means for calculating a refractive index of material of the lens, based on a difference of the optical characteristic of the lens in the medium among the wavelengths; and a converting means for converting the optical characteristic of the lens in the medium into an optical characteristic of the lens in the air, based on the refractive index calculated by the refractive index calculating means.

Preferably, the light source portion comprises monochromatic light emitting sources different in emission wavelength from each other, or the light source portion comprises a light emitting source which emits measuring light having a wavelength distribution and a plurality of filters each of which allows the measuring light of the three different wavelengths to pass through. Preferably, if the light source portion comprises the monochromatic light emitting sources, the light receiving portion comprises a filter capable of resolving measuring light into measuring light of at least three different wavelengths and a light receiving sensor for receiving the resolved measuring light, and the monochromatic light emitting sources are simultaneously turned on to emit light. In this situation, it is desirable that the wavelength of the measuring light comprises a red wavelength, a green wavelength, and a blue wavelength. However, if the material of the contact lens or the liquid does not possess extraordinary absorbing properties and if the wavelengths are apart from each other at a distance more than a fixed distance, only infrared rays of light may be used as the measuring light.

The lens meter further comprises a splitting optical member, situated between the light source portion and the lens or situated between the lens and the light receiving portion, for splitting the measuring light into numbers of measuring light. A distribution of the optical characteristic of the lens is measured according to the numbers of measuring light.

In order to achieve the object, a lens meter according to another aspect of the present invention comprises a light source portion for emitting measuring light having at least two different wavelengths; a light receiving portion for receiving the measuring light which has passed through a lens to be inspected, the lens being immersed in a liquid as a medium; an in-medium optical characteristic measuring means for measuring an optical characteristic of the lens in the medium about each wavelength, based on a deviated quantity of the measuring light detected by the light receiving portion; a material presuming means for presuming a material of the lens, based on a difference of the optical characteristic of the lens in the medium between the wavelengths; a refractive index storing means for storing a refractive index of the material of the lens; and a converting means for converting the optical characteristic of the lens in the medium into an optical characteristic of the lens in the air, based on the refractive index of the material presumed by the material presuming means.

This invention has the advantage that a measurement value of the optical characteristic of the lens to be inspected which has been measured in a state of being immersed in a liquid is convertible into a measurement value of the optical characteristic of the lens which has been measured in the air with accuracy even if the refractive index of the material of the lens is unknown.

A measuring vessel used to measure an optical characteristic of a contact lens while immersing the contact lens in a liquid according to an aspect of the present invention has projections for positioning the contact lens.

A measuring vessel used to measure an optical characteristic of a contact lens while immersing the contact lens in a liquid according to another aspect of the present invention has a lens setting surface having a shape to fit a curved surface of the contact lens.

A measuring vessel used to measure an optical characteristic of a contact lens while immersing the contact lens in a liquid according to still another aspect of the present invention comprises a vessel body and a lid member. The vessel body has projections for positioning the contact lens, and the lid member has air holes through which bubbles in the vessel body are discharged.

BRIEF DESCRIPTION OF THE DRAWINGS

FIGS. 5(a) and 5(b) show a modification of a light receiving portion shown in FIG. 1, FIG. 5(a) shows a so-called three-plate type light receiving CCD sensor, and FIG. 5(b) shows a filter of a so-called monoplate type light receiving CCD sensor.

FIG. 6 shows another modification of the light source portion shown in FIG. 1.

FIG. 8(a) shows an image of the net pattern when a lens to be inspected which has a convex spherical power is in a measuring optical path, and FIG. 8(b) shows an image of the net pattern when a lens to be inspected which has a concave spherical power is in the measuring optical path.

DETAILED DESCRIPTION OF THE EMBODIMENT

Figure 1:
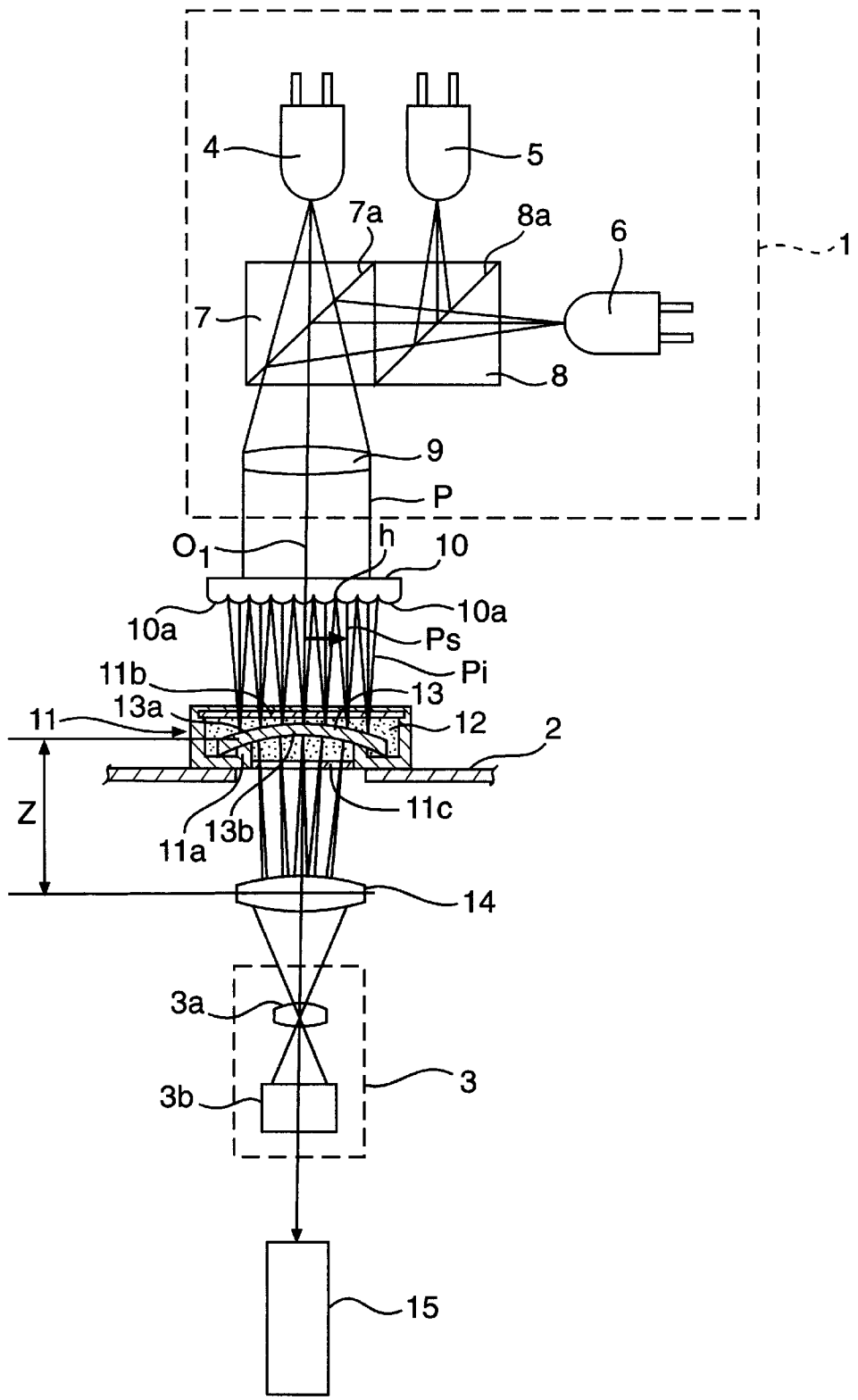
FIG. 1 shows optical systems of a lens meter according to the present invention.
Figure 2:
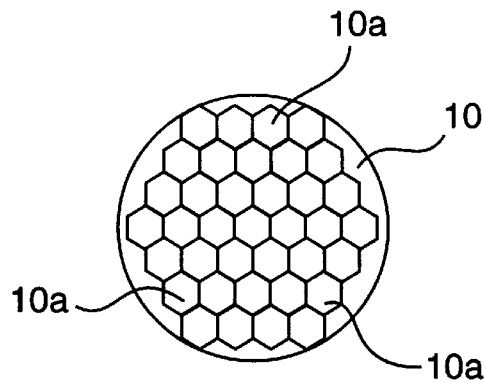
FIG. 2 is a plan view of a microlens array shown in FIG. 1.

In FIG. 1, reference numeral 1 designates a light source portion, reference numeral 2 designates a lens receiving plate, and reference numeral 3 designates a light receiving portion. The light source portion 1 includes three LEDs 4, 5, 6, two dichroic prisms 7, 8, and a collimation lens 9. The LEDs 4, 5, 6 serve as monochromatic light sources which emit beams of measuring light P having at least three different wavelengths. The LED 4 emits red measuring light, the LED 5 emits green measuring light, and the LED 6 emits blue measuring light. The dichroic prism 7 is a long-pass filter and has a mirror surface 7a which reflects the green and blue measuring light while allowing the red measuring light to pass through. The dichroic prism 8 is a short-pass filter and has a mirror surface 8a which reflects green measuring light while allowing blue measuring light to pass through. Instead of the LEDs 4, 5, 6, semiconductor lasers (LD) may be used as monochromatic light sources. If so, polarization beam splitters may be used in place of the dichroic prisms 7, 8 because polarized light of the semiconductor laser (LD) can be used. The collimation lens 9 converts the beams of the measuring light emitted by the LEDs 4, 5, 6 into parallel rays. For example, a microlens array 10 is disposed in a measuring optical path between the lens receiving plate 2 and the collimation lens 9. The microlens array 10 has microlenses 10a as shown in, for example, FIG. 2. The number of the microlenses 10a is, for example, 1,000. Each of the microlenses 10a has substantially the identical focal length. According to the parallel light rays, the microlenses 10a generate condensed light rays the number of which corresponds to the number of the microlenses 10a.

A measuring vessel if is set on the lens receiving plate 2. The measuring vessel 11 is filled with a preserving liquid 12, such as physiological salt solution. A soft contact lens as a lens 13 to be inspected is immersed in the liquid 12. The measuring vessel 11 has lens positioning projections 11a, a top cover glass 11b, and a reverse cover glass 11c. By the lens positioning projections 11a, the lens 13 to be inspected is situated in the vicinity of a back focal point of the microlens array 10 in the measuring vessel 11. Images of point sources corresponding to the microlenses 10a are formed on the lens 13. The condensed light rays Pi which have passed through the lens 13 are each guided to the light receiving portion 3 through a relay lens 14. The light receiving portion 3 comprises a CCD camera. The COD camera is made up of a TV lens 3a and a light receiving CCD sensor 3b.

A principal light ray Ps of the condensed light ray Pi which strikes the lens 13 is parallel to an optical axis 01 of the measuring optical path. After passing through the lens 13, the principal light ray Ps is deflected. The degree of deflection of the principal light ray Ps depends on both the height h of incidence from the optical axis 01 and the power of the lens 13 at the position of incidence. The height h of incidence of the principal light ray Ps is known according to the respective microlenses 10a. The power S of the surface 13a of the lens 13 at each position is obtained from the following equations:

$$S = \tan(\theta(10 \cdot h)) \quad (5)$$

$$\theta = \tan^{-1}(h - \beta \cdot hi)/2) \quad (6)$$

wherein $\theta$ is a deflected angle of the principal light ray Ps which has passed through the lens 13, hi is a height at the light receiving CCD sensor 3b, $\beta$ is a relay magnification, and Z is a distance from the reverse 13b of the lens 13 to the relay lens 14. Accordingly, if the unknown height hi at the light receiving CCD sensor 3b is obtained, the deflected angle $\theta$ is obtained from Eq. (6). Accordingly, the power S thereof is obtained from Eq. (5). In other words, based on the quantity of deviation from a reference position on the lights receiving CCD sensor 3b where the principal light ray Ps is received when the lens 13 is not set in the measuring optical path, the refractive index of the lens 13 in the medium can be measured when the lens 13 is set in the measuring optical path. Since this measuring principle is not directly pertinent to the present invention, see Japanese Patent Application Laid-Open Publication No. Hei 7-189289 if necessary. Referring to the position of the microlens array 10, the microlens array 10 may be situated between the lens 13 and the light receiving portion 3, not between the light source portion 1 and the lens 13.

The LEDs 4, 5, 6 are turned on and driven one after the other. The beams of measuring light P from the LEDs 4, 5, 6 are individually deflected by the lens 13 and are successively received by the light receiving CCD sensor 3b. Received-light outputs of the light receiving CCD sensor 3b are input to a processing circuit 15 one after the other. The degree of deflection of the measuring light P caused by the lens 13 depends on its wavelength. Therefore, as a result of measuring the power distribution of the lens 13 by the use of the three measuring light P with wavelengths differing from each other, a different optical characteristic value can be obtained as to each wavelength. This optical characteristic value is a value obtained in a state in which the lens 13 to be inspected is immersed in the liquid as a medium. Therefore, it is required to convert it into an optical characteristic value obtained in the air.

A description will now be given of the principle of converting the three different optical characteristic values as to the respective wavelengths into the optical characteristic values of the lens 13 in the air.

Generally, it is known to use Herzberger's dispersion formula as a means for obtaining a refractive index of an optical glass with respect to a wavelength, This dispersion formula is $$n\lambda = 1 + (n_d - 1)\{1B(\lambda) + A(\lambda)/V_d\} \quad (7)$$

wherein $n\lambda$ is a refractive index of an optical glass with respect to a wavelength of $\lambda$, $n_d$ is a refractive index of the optical glass in the air with respect to D-lines, $V_d$ is Abbe number, and $B(\lambda)$ and $A(\lambda)$ are variables according to the wavelength of $\lambda$ but are constants directly obtained by fixing the wavelength of $\lambda$.

If the term $(1/r_1 - 1/r_2)$ in Eq. (2) is replaced with R, Eq. (2) is transformed as follows:

$$n = (n_w/R) \cdot (Sw + R) \quad (2)'$$

If the refractive index obtained when measurement is carried out in a wavelength of $\lambda$, is $n_1$, and the refractive power in the wavelength of $\lambda$, is $S_{w1}$, Eq. (2)' is expressed as follows:

$$n_2 = (n_w/R) \cdot (S_{w1} + R) \quad (8)$$

On the other hand, Eq. (7) can be transformed into the following dispersion formula including the wavelength of $\lambda$.

$$n_1 = 1 + (n_d - 1)\{1 + B(\lambda_1) + A(\lambda_1)/V_d\} \quad (7)'$$

If the refractive index $n_1$ is deleted from Eqs. (8) and (7)', the following equation (9) is obtained.

$$(n_w/R) \cdot (S_{w1} + R) = 1 + (n_d - 1)\{1 + B(\lambda_1) + A(\lambda_1)/V_0\} \quad (9)$$

In Eq. (9), the refractive index $n_w$ of the medium is known, and the constants $A(\lambda_1)$ and $B(\lambda_1)$ can be fixed because the measuring wavelength is known. The refractive power $S_{w1}$ is an optical characteristic value in the wavelength of $\lambda_1$ obtained by the measurement. Still unknown values are $n_d$, $V_d$, and R. If the refractive powers $S_{w2}$ and $S_{w3}$ in the measuring wavelengths $\lambda_2$ and $\lambda_3$ are respectively obtained as above, the following equations are obtained.

$$(n_w/R) \cdot (S_{w2}+R) = 1 + (n_d-1)\{1+B(\lambda_2)+A(\lambda_2)/V_d\} \quad (10)$$

$$(n_w/R) \cdot (S_{w3}+R) = 1 + (n_d 1)\{1+B(\lambda_3)+A(\lambda_3)/V_d\} \quad (11)$$

There are three kinds of unknown values as mentioned above, and there are three equations, Accordingly, the refractive index $n_o$ of material in D-lines in the air is obtained by solving the simultaneous equations according to Eqs. (9), (10), and (11). Accordingly, if a calculation value of this refractive index $n_0$ is used as the refractive index n of the material in Eq. (4), it is possible to, according to Eq. (4),, obtain the refractive power $S_0$ of the lens 13 in the air, in other words, obtain a power distribution which is an optical characteristic value at each position on the surface of the lens 13.

The processing circuit 15 includes a means for obtaining an optical characteristic of the lens 13 in the medium as to each wavelength from a quantity of deviation of measuring light P detected by the light receiving portion 3, a refractive index calculating means for calculating a refractive index of material of the lens 13 as to each wavelength, and a means for, according to a refractive index obtained by the refractive index calculating means, converting the optical characteristic in the medium into an optical characteristic of the lens 13 in the air.

According to Herzberger's dispersion formula, in the case of general optical glass, the constants $A(\lambda)$ and $B(\lambda)$ which are each a function of a wavelength are obtained from the following equations.

$$A(\lambda) = -1.294878 + 0.068927\lambda^2 + 0.37349/(\lambda^2-0.035) + 0.005799/(\lambda^2-0.035)^2$$

$$B(\lambda) 0.001255 - 0.007058\lambda^2 + 0.001071/(\lambda^2-0.035) + 0.0002180/(\lambda^2-0.035)^2$$

If the lens 13 to be inspected is a soft contact lens, resin is used as material. Additionally, if these values are impossible to apply, experimental data about each material of the lens 13 is obtained, values in the equations of $A(\lambda)$ and $B(\lambda)$ are then recalculated, and the results are beforehand stored in a storing means, because the soft contact lens is limited in material.

Modification 1

Figure 3:
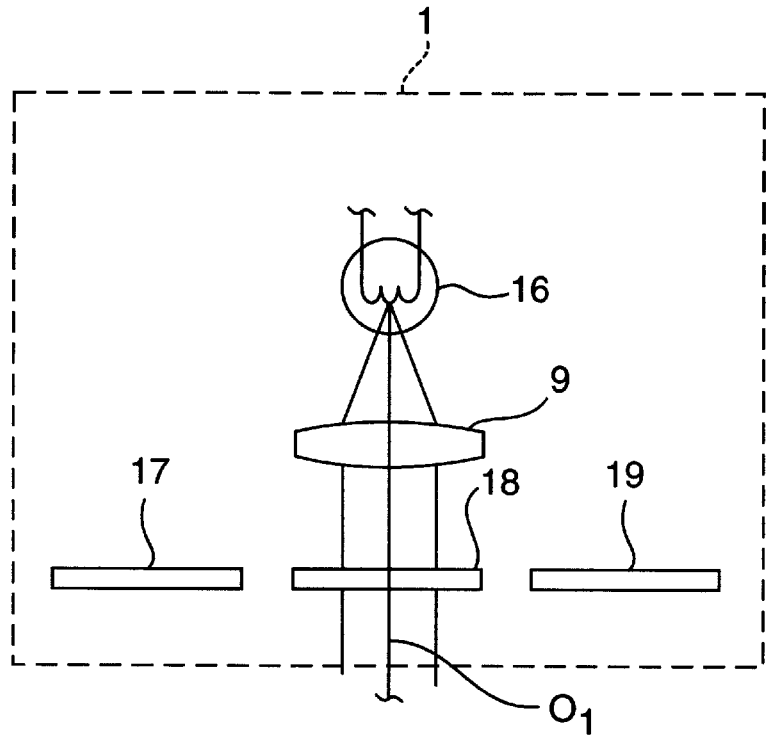
FIG. 3 is an optical view showing a modification of a light source portion shown in FIG. 1.
Figure 4:
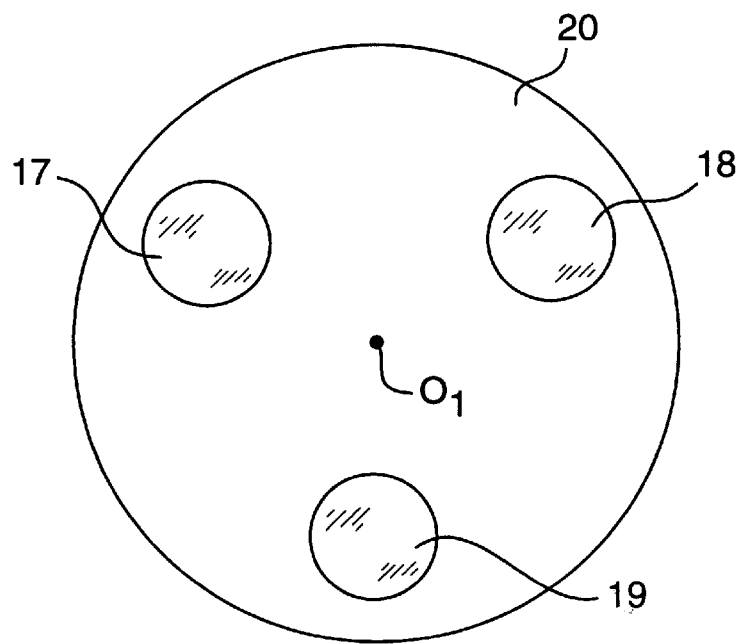
FIG. 4 is a plan view showing a state in which filters shown in FIG. 3 are set in a rotational disk.

FIG. 3 shows a modification of the light source portion 1. In this modification, the light source portion 1 is made up of a light emitter 16, a collimation lens 9, and three filters 17, 18, and 19. As shown in FIG. 4, the filters 17, 18, and 19 are attached to a rotary plate 20. The filters 17, 18, and 19 are inserted into the measuring optical path or are removed therefrom by turning the rotary plate 20 on an axis $O_2$. The filter 17 allows red measuring light P to pass through, the filter 11 allows green measuring light P to pass through, and the filter 19 allows blue measuring light P to pass through. The rotation of the rotary plate 20 makes it possible to successively obtain optical characteristic values in a medium in each wavelength.

Modification 2

FIG. 5(a) shows a modification of the light receiving portion 3. If the monochromatic light sources 4, 5, and 6 are used as the light source portion 1, dichroic prisms 21, 22 may be situated between the TV lens 3a and the three light receiving CCD sensors 3b. The dichroic prism 22 has a reflection surface 22a which reflects green and blue measuring light while allowing red measuring light to pass through. The dichroic prism 21 has a reflection surface 21a which reflects the blue measuring light while allowing the green measuring light to pass through. If the light receiving portion 3 comprises the so-called three-plate type light receiving CCD sensor 3b, the monochromatic light sources 4, 5, 6 are simultaneously turned on to emit light, and thereby measurement values about the lens 13 to be inspected in the air are obtained.

FIG. 5(b) shows another modification of the light receiving portion 3. If the monochromatic light sources 4, 5, and 6 are used as the light source portion 1 and if the light receiving portion 3 comprises the so-called monoplate type light receiving CCD sensor provided with a filter 3' that consists of R, G, and 8 in front of each pixel of the light receiving CCD sensor 3b, the resolving power in measurement is lowered to one third. However, measurement values about the lens 13 to be inspected in the air can be obtained by turning on the monochromatic light sources 4, 5, and 6 simultaneously to emit light, as in the modification of FIG. 5(a). Additionally, the size of the lens meter can be diminished. Of course, the arrangement of R, G, and B of the filter 3' is not limited to this modification.

Modification 3

Figure 7:
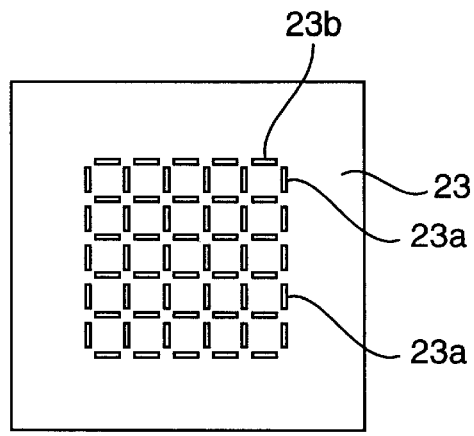
FIG. 7 is a plan view of a net pattern plate shown in FIG. 6.
Figure 8A:
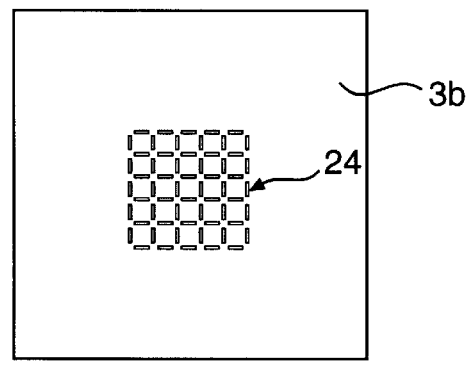
FIGS. 8(a) and 8(b) show images of a net pattern shown in FIG. 7 which are received by the light receiving portion through a lens to be inspected.
Figure 8B:
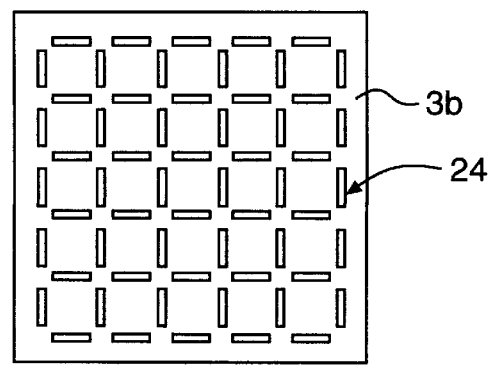

FIG. 6 shows a modification in which a net pattern plate 23 serving as a splitting optical member is disposed in place of the microlens array 10 so that a net pattern is projected onto the lens 13 to be inspected. As shown in FIG. 7, the net pattern plate 23 has plenty of slits 23a arranged vertically and horizontally. Areas excluding the slits 23a of the net pattern plate 23 intercept light. A beam of measuring light P passes through the slits 23a and is split into many rays. These rays are guided to the lens 13. The measuring light P' of the net pattern is projected onto the lens 13. When passing through the lens 13, the net-patterned measuring light P' is deflected because of the optical characteristic of the lens 13. When the lens 13 is out of the measuring optical path, the same pattern as the pattern of the net pattern plate 23 is formed on the light receiving CCD sensor 3b. When the lens 13 with a convex spherical power is in the measuring optical path, a net pattern 24 similar to but smaller in size than the pattern of the net pattern plate 23 is formed thereon, as shown in FIG. 8(a). When the lens 13 with a concave spherical power is in the measuring optical path, a net pattern 24 similar to but larger in size than the pattern of the net pattern plate 23 is formed thereon, as shown in FIG. 8(b). According to a variation in pattern size of the net pattern 24, the power distribution of the lens 13 is obtained. The net pattern plate 23 may be situated between the lens 13 and the light receiving portion 3.

Modification 4

Figure 9:
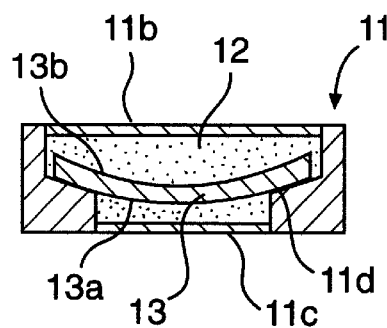
FIG. 9 is a sectional view showing a modification of a measuring vessel.

FIG. 9 shows a modification of the measuring vessel 11. In this modification, a lens setting surface lid is formed corresponding to the shape of the lens 13. For measurement, the lens 13 is set upside down.

Modification 5

Figure 10:
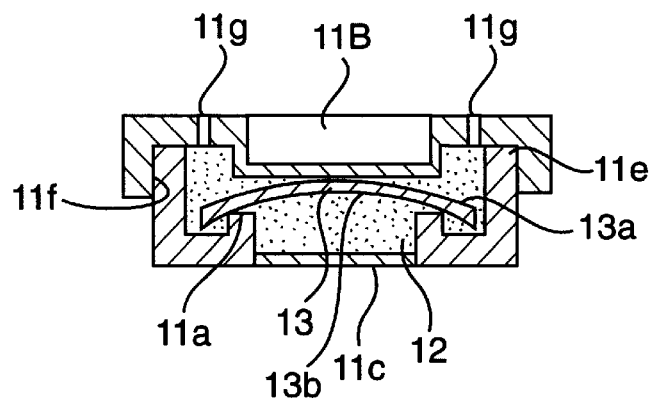
FIG. 10 shows an example where the measuring vessel also serves as a preserving vessel for soft contact lenses.

FIG. 10 shows a modification in which the measuring vessel 11 is usable both as a measuring vessel and as a preserving vessel. The measuring vessel 11 is made up of a vessel body 11A and a lid member 11B. A screw portion 11e is formed on the outer circumference of the upper part of the vessel body 11A. A screw portion 11f for engagement with the screw portion 11e is formed on the inner circumference of the lid member 11B. The lid member 11B is made from transparent material. The lid member 11B has air holes through which bubbles of a preserving liquid 12 are discharged. According to this modification, the measuring vessel 11 also serves as a preserving vessel.

Modification 6

In the aforementioned embodiment, the optical characteristic of the lens 13 in a medium is measured by the use of measuring light P with three different wavelengths. However, for the measurement, use may be made of measuring light P with two different wavelengths, instead of the measuring light P with three different wavelengths. In this modification, it is impossible to directly obtain the refractive index, Abbe number, and the like of the material of the lens 13, but it is possible to obtain the difference between the refractive powers of the two different wavelengths in a medium. Referring to the type of a contact lens, a quick judgment can be formed as to whether the lens 13 is a soft contact lens or a hard contact lens. Additionally, since the soft contact lens is limited in material, the material of the lens 13 is presumable from the difference between the refractive powers of the two different wavelengths in the medium. Therefore, by storing the refractive index of the material of the lens 13 beforehand, the refractive power of the lens 13 in the medium is convertible to that in the air regardless of the fact that the refractive index of the material of the lens 13 cannot be found directly. Therefore, the processing circuit 15 is required to include a material presuming means for presuming the material of the lens 13 from a difference in optical characteristic of the lens in a medium about each wavelength, a refractive index storing means for storing the refractive index of the lens material, a converting means for converting an optical characteristic of the lens 13 in the medium into that in the air on the basis of the refractive index of the material presumed by the material presuming means.

What is claimed is:

1. A vessel used for measuring an optical characteristic of a contact lens submerged in a liquid, the vessel comprising:
    a vessel body having a top portion and a bottom portion, the top portion having a top opening and the bottom portion having a flanged portion and a bottom opening defined by the flanged portion, the flanged portion having a projection extending upwardly for receiving the contact lens for inspection;
    a top cover member hermetically sealing the top opening; and
    a bottom cover member hermetically sealing the bottom opening.

2. A vessel used for measuring an optical characteristic of a contact lens submerged in a liquid, the vessel comprising:
    a vessel body having a top portion and a bottom portion, the top portion having a top opening and the bottom portion having a flanged portion and a bottom opening defined by the flanged portion, the flanged portion having a lens setting surface for receiving the contact lens for inspection, the lens setting surface having a curvature corresponding to a curvature of the contact lens;
    a top cover member hermetically sealing the top opening; and
    a bottom cover member hermetically sealing the bottom opening.

3. A vessel used for measuring an optical characteristic of a contact lens submerged in a liquid, the vessel comprising:
    a vessel body having a top portion and a bottom portion, the top portion having a top opening and the bottom portion having a flanged portion and a bottom opening defined by the flanged portion, the flanged portion having a projection extending upwardly for receiving the contact lens for inspection;
    a top cover member hermetically sealing the top opening and having an aperture for discharging gas from the vessel body; and a bottom cover member hermetically sealing the bottom opening.

* * * * *